(12) United States Patent
Zakrzewski et al.

(10) Patent No.: US 8,402,844 B2
(45) Date of Patent: Mar. 26, 2013

(54) ROVING WIRELESS SENSOR AND METHOD FOR USE IN A VEHICLE HEALTH AND USAGE MONITORING SYSTEM

(75) Inventors: Radoslaw Romuald Zakrzewski, South Burlington, VT (US); Michael Anthony Lynch, Arlington, VT (US); Robert Zeliff, Bridport, VT (US); Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 928 days.

(21) Appl. No.: 12/038,419

(22) Filed: Feb. 27, 2008

(65) Prior Publication Data

US 2009/0211381 A1    Aug. 27, 2009

(51) Int. Cl.
*G01N 19/00*    (2006.01)
(52) U.S. Cl. ......................................... 73/865.9
(58) Field of Classification Search .................. None
See application file for complete search history.

(56) References Cited

U.S. PATENT DOCUMENTS

| 4,072,926 | A  | * | 2/1978  | Shimahara et al. | ........... | 340/448 |
| 4,858,469 | A  | * | 8/1989  | Hosgood et al.   | ................ | 73/579  |
| 4,998,438 | A  | * | 3/1991  | Martin           | .......................... | 73/146.8 |
| 6,192,759 | B1 | * | 2/2001  | Schoess          | .......................... | 73/583  |
| 6,688,168 | B1 | * | 2/2004  | Elliott et al.   | ..................... | 73/146  |
| 6,731,205 | B2 | * | 5/2004  | Schofield et al. | ............. | 340/444 |
| 2004/0078662 | A1 |  | 4/2004  | Hamel et al.     | | |
| 2004/0089082 | A1 | * | 5/2004  | Gifford et al.   | ............... | 73/866.5 |
| 2006/0243180 | A1 |  | 11/2006 | Sundermeyer et al. | | |
| 2007/0095160 | A1 |  | 5/2007  | Georgeson et al. | | |
| 2007/0241740 | A1 | * | 10/2007 | Hawes            | ........................ | 324/149 |
| 2008/0036617 | A1 |  | 2/2008  | Arms et al.      | | |
| 2008/0117036 | A1 | * | 5/2008  | Kenny et al.     | ................... | 340/447 |

FOREIGN PATENT DOCUMENTS

| EP | 0 407 179 | 1/1991 |
| EP | 1 246 094 | 10/2002 |

OTHER PUBLICATIONS

Combined Search and Examination Report from corresponding British Application No. GB0902502.4 dated May 13, 2009.
Office Action for U.S. Appl. No. 12/038,463 dated Oct. 13, 2010.
Search Report for corresponding British Application No. GB0902379.7 dated Jun. 11, 2009.
Office Action mailed Apr. 7, 2011 in connection with U.S. Appl. No. 12/038,463, filed Feb. 27, 2008.
AAR400, *HUMS R&D Projects/Tasks* (visited Nov. 2, 2007) http://aar400.tc.faa.gov/Programs/AgingAircraft/rotorcraft/HUMS.htm.

(Continued)

*Primary Examiner* — Robert R Raevis
(74) *Attorney, Agent, or Firm* — Smith Moore Leatherwood LLP (57) ABSTRACT

A health and usage monitoring system for use in monitoring health and usage of one or more components of a vehicle. In various embodiments, the present invention uses at least one roving wireless sensor that can be temporarily placed in a first position to monitor one or more components of the vehicle and then moved to another position to monitor one or more other components of the vehicle, thus reducing the total number of sensors used to monitor the vehicle. In some embodiments, a system according to the present invention may comprise at least one or more roving wireless sensors. Other embodiments may comprise one or more roving wireless sensors used in conjunction with one or more wired sensors. The present invention also provides similar embodiments for a method of monitoring the health and usage of one or more components of a vehicle.

27 Claims, 4 Drawing Sheets

OTHER PUBLICATIONS

AAR400, *Health and Usage Monitoring Systems (HUMS) R&D* (visited Nov. 2, 2007) http://aar400.tc.faa.gov/Programs/AgingAircraft/rotorcraft/HUMS.htm.

OuterLink, Goodrich and Draper Laboratory Enable Wireless HUMS for Navy Aircraft—Satellite-based Aircraft Connectivity Delivers Health and Usage Monitoring System (HUMS) Data for Enhanced Flight Safety (visited Nov. 13, 2007) http://www.acq.osd.mil/jctd/articles/HUMS.htm.

Freshwater Technology, PMG Perpetuum, *Aerospace industry is quiet to see potential of wireless sensing using vibration energy havesting microgenerators* (visited Nov. 13, 2007) http://www.freshwatertechnology.com/pr_perpetuum/per017.php.

Flight Data Services, *Helicopter Monitoring* (visted Nov. 2, 2007 and Feb. 27, 2008) http://www.flightdataservices.com/helicoptermonitoring.html.

David Jensen, Aviation Maintenance, *HUMS*, Oct. 1, 2006 (visited Nov. 2, 2007 and Feb. 27, 2008) http://www.aviationtoday.com/print/am/categories/military/5250.html.

Aviation Maintenance, *HUMS: Health and Usage Monitoring Systems*, Feb. 1, 2006 (visited Nov. 2, 2007 and Feb. 27, 2008) http://www.aviationtoday.com/print/am/categories/bga/76.html.

* cited by examiner

ROVING WIRELESS SENSOR AND METHOD FOR USE IN A VEHICLE HEALTH AND USAGE MONITORING SYSTEM

FIELD OF THE INVENTION

The present invention is directed to Health and Usage Monitoring Systems used to monitor the health and usage of engine and/or drive components of various vehicles.

BACKGROUND OF THE INVENTION

The in-flight failure of any engine and/or drive component of an aircraft can be catastrophic. For example, the failure of a drive component of a helicopter may lead to loss of life. While it is true that a failure of an engine component of one engine in a multi-engine airplane may not lead to loss of life, such a failure may be tremendously costly, resulting in unscheduled and expensive maintenance of the aircraft.

In response to concerns relating to such failures, certain governing bodies charged with regulating and overseeing aviation have begun to require the use of Health and Usage Monitoring Systems (HUMS) for various aircraft. In the past, any monitoring of critical components of an aircraft was performed by manual inspection before and after flights. Unfortunately, these manual inspection techniques were, at best, insufficient and were generally only successful in confirming the failure of a critical component.

HUMS represent technologically advanced monitoring systems that can forewarn of the upcoming failure of a component of the engine and/or drive system of an aircraft. Typical HUMS generally comprise a series of sensors and one or more data acquisition systems. The sensors are placed on critical components of the engine and drive systems, and the data acquisition system gathers data relating to the performance of the monitored components. For example, a helicopter HUMS may comprise a series of accelerometers that are placed on various components of the engine and drive system, such as components of the tail gear box, intermediate gear box, tail drive shaft, and main gear box. A data acquisition system gathers vibration data from each of the sensors, and the data may then be analyzed after flight. Based on the known frequency responses of the monitored components, aberrations that are indicative of impending component failures may be noted during analysis. As a result, suspect components can be scheduled for maintenance prior to their failure.

The use of HUMS has dramatically improved the overall safety records of aircraft employing its technology. Reports indicate that HUMS use in aircraft has resulted in high success rates in detecting defects, as well as reductions in check flights, tests, and unscheduled maintenance. Thus, the use of HUMS allows an equipped aircraft to maintain a higher level of safety while increasing its operational readiness. Although beneficial, HUMS generally introduce weight tradeoffs, which ultimately translate into increased costs. In some rotary aircraft cases, every pound of extra weight in a helicopter can translate into approximately a thousand dollars in recurring costs and tens of thousands of dollars in non-recurring costs. Not to mention the cost of the HUMS system itself, which can reach a thousand dollars or more per sensor. Furthermore, the complexity of the aircraft can increase these costs. A typical helicopter HUMS may include more than thirty sensors, each hardwired to a data acquisition system. Additionally, each bulkhead of an aircraft will require through-bulkhead connectors for the sensor wires. Not only do the connectors add cost and weight to the aircraft, but they require increased installation time.

Thus, there is a need for an improved Health and Usage Monitoring System for use in monitoring the health and usage of various components of a vehicle. The improved HUMS should provide accurate monitoring of key components of the vehicle and provide the ability to adapt to changing monitoring needs while providing efficient cost and weight characteristics.

BRIEF SUMMARY OF THE INVENTION

The present invention addresses the above needs and achieves other advantages by providing a health and usage monitoring system for use in monitoring health and usage of one or more components of a vehicle. In various embodiments, the system uses at least one roving wireless sensor that can be temporarily placed in a first position to monitor one or more components of the vehicle and then moved to another position to monitor one or more other components of the vehicle, thus reducing the total number of sensors used to monitor the vehicle.

In one embodiment, the present invention provides a health and usage monitoring system for use in monitoring health and usage of one or more components of a vehicle, the system comprising a data access point, and at least one wireless sensor configured to be temporarily placed in a first position to monitor one or more components of the vehicle and to communicate monitoring data to the data access point, wherein the wireless sensor is further configured to be removable from the first position and placeable in at least one other position to monitor one or more other components of the vehicle and to communicate monitoring data to the data access point, thus allowing two or more components of the vehicle to be monitored using the wireless sensor. In some embodiments, the system may further comprise at least one processing element in communication with and configured to control the wireless sensor. In some embodiments, the system may further comprise at least one power supply configured to provide power to the wireless sensor. In some embodiments the power supply may comprise at least one of a battery or an energy harvesting device. In some embodiments, the power supply may comprise at least one of an inductive energy harvesting device or a piezoelectric energy harvesting device. In some embodiments, the wireless sensor may comprise a wireless accelerometer.

In some embodiments, the health and usage monitoring system may be configured to monitor one or more components of a helicopter. In some embodiments, the one or more components of the helicopter may be selected from the group consisting of: one or more components of a tail gear box of the helicopter; one or more components of a tail rotor assembly of the helicopter; one or more components of an intermediate gear box of the helicopter; one or more drive shaft bearings of the helicopter; one or more components of an engine of the helicopter; one or more components of a main gear box of the helicopter; one or more components of a main rotor assembly of the helicopter; and combinations thereof. In some embodiments, the one or more components of a helicopter may include one or more components of a main rotor head of the helicopter or one or more components of a fuselage of the helicopter. In some embodiments, the processing element may comprise power management software configured to manage power usage of the wireless sensor. In some embodiments, the processing element may be configured to provide programmable data sample rates. Some embodiments may further comprise at least one wired sensor configured to monitor one or more components of the aircraft and to communicate monitoring data to a data access point via a wired connection.

The present invention also provides similar embodiments for a method of monitoring the health and usage of one or more components of a vehicle.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

It should be noted that although the present specification and appended drawings show and describe a health and usage monitoring system used to monitor the health and/or usage of one or more components of a helicopter, various other embodiments of the present invention may be used to monitor the health and/or usage of one or more components of any vehicle, including, but not limited to, aircraft, watercraft, and any other man-made means of transportation, such as trains, automobiles, trucks, motorcycles, ATVs, etc.

As noted above, any decrease in weight or installation complexity of a helicopter health and usage monitoring system can translate into thousands of dollars in savings. The present invention decreases the costs associated with monitoring the components of a vehicle by using at least one "roving" wireless sensor that can be positioned proximate any of the one or more components of the vehicle and that can be repositioned proximate one or more other components of the vehicle. As a result, the total number of sensors used to monitor the vehicle may be significantly reduced.

Figure 1:
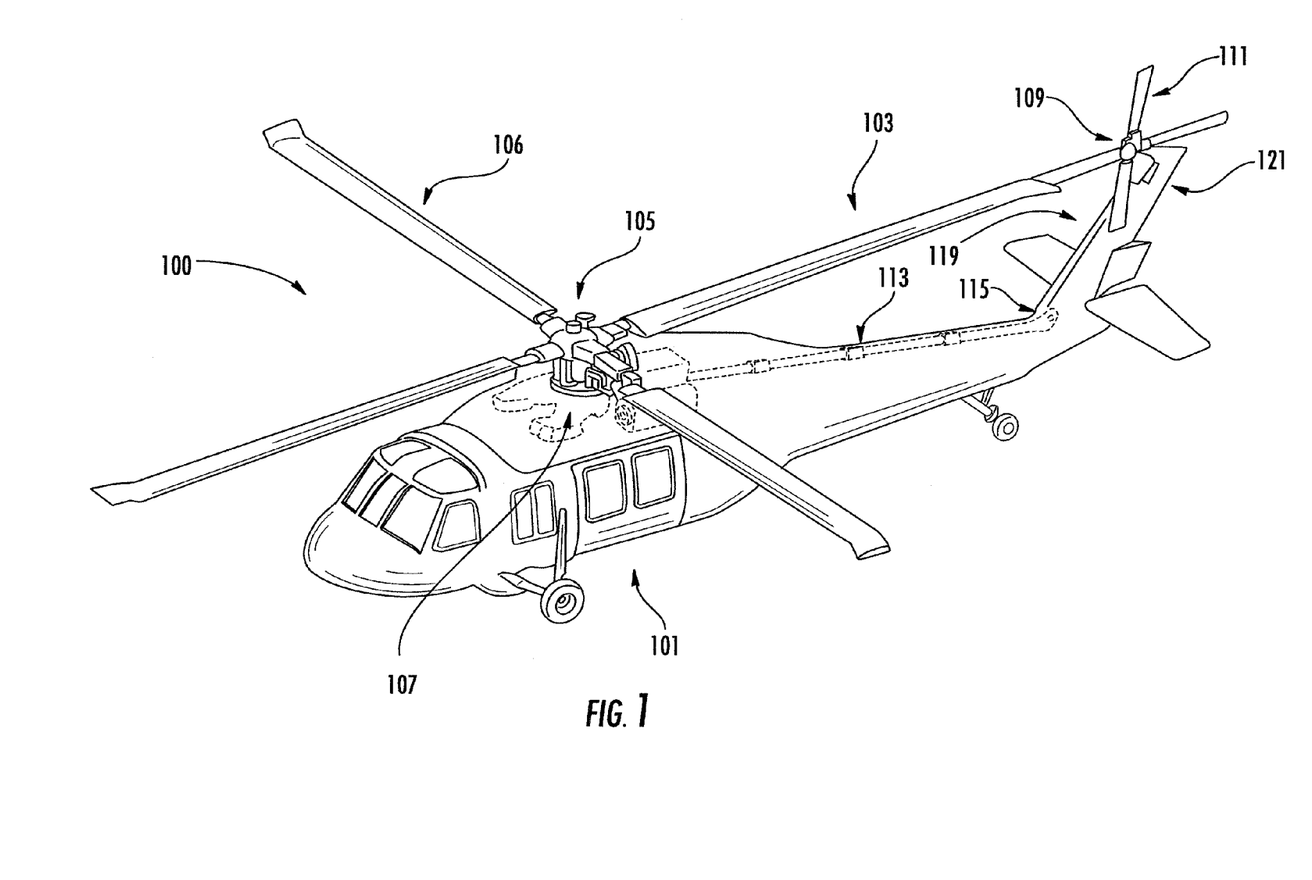
FIG. 1 shows a helicopter and the helicopter engine and drive train components as an example of a vehicle upon which the present invention may be embodied.

FIG. 1 shows a helicopter 100 as an example of a vehicle upon which the present invention may be embodied. It should be noted that although FIG. 1 and the subsequent figures show an embodiment of the present invention used to monitor the health and usage of one or more components of helicopter 100, in other embodiments the present invention may be configured to monitor one or more components of any vehicle, including other aircraft such as other rotary-wing aircraft, as well as fixed-wing aircraft.

Helicopter 100, shown in the depicted embodiment of FIG. 1, generally includes a body 101 and a propulsion system 103. The propulsion system 103 of helicopter 100 includes a single main rotor assembly 105, upon which four main rotor blades 106 are mounted, and a tail rotor assembly 109, which is included to counter torque on the body 101 caused by the main rotor assembly 105. The tail rotor assembly 109 includes four tail rotor blades 111. The main rotor assembly 105 is powered by main gear box 107. A first drive shaft 113 is connected to the main gear box 107 and extends along the length of the helicopter body 101 to an intermediate gear box 115. A series of hanger bearings 117 (shown in FIG. 3) support the first drive shaft 113 along the length of the helicopter body 101. A second drive shaft 119 extends from the intermediate gear box 115 to a tail gear box 121, which powers the tail rotor assembly 109.

Figure 2:
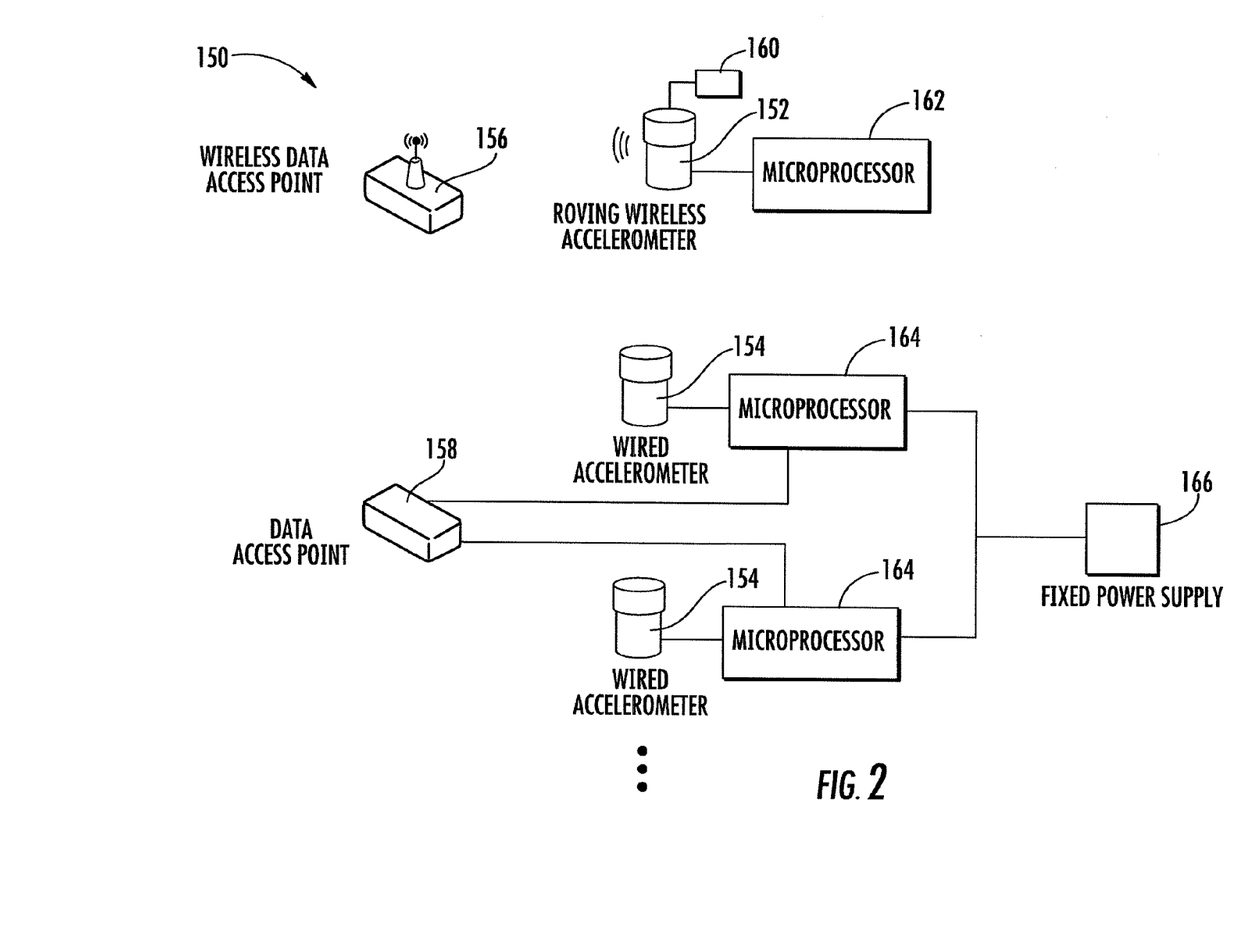
FIG. 2 shows a health and usage monitoring system according to one embodiment of the present invention.

FIG. 2 shows a schematic representation of a health and usage monitoring system 150 according to one embodiment of the present invention. The health and usage monitoring system 150 is configured to capture monitoring data of one or more components of the aircraft 100 using a series of sensors. In the depicted embodiment, the sensors comprise at least one roving wireless accelerometer 152 and a series of wired accelerometers 154. Examples of suitable wireless accelerometers include, but need not be limited to, wireless accelerometers produced by Techkor Instrumentation® and wireless accelerometers produced by Micro Strain®. Examples of suitable wired accelerometers include, but need not be limited to, accelerometers produced by Endevco Corporation, Wilcoxon Research, PCB Piezotronics, Inc., and Dytran Instruments, Inc. It should be noted that in other embodiments the sensors of a health and usage monitoring system in accordance with the present invention need not include any wired sensors and may comprise entirely of one or more roving wireless sensors. In still other embodiments, the system may comprise any number or wireless and wired sensors.

Figure 2A:
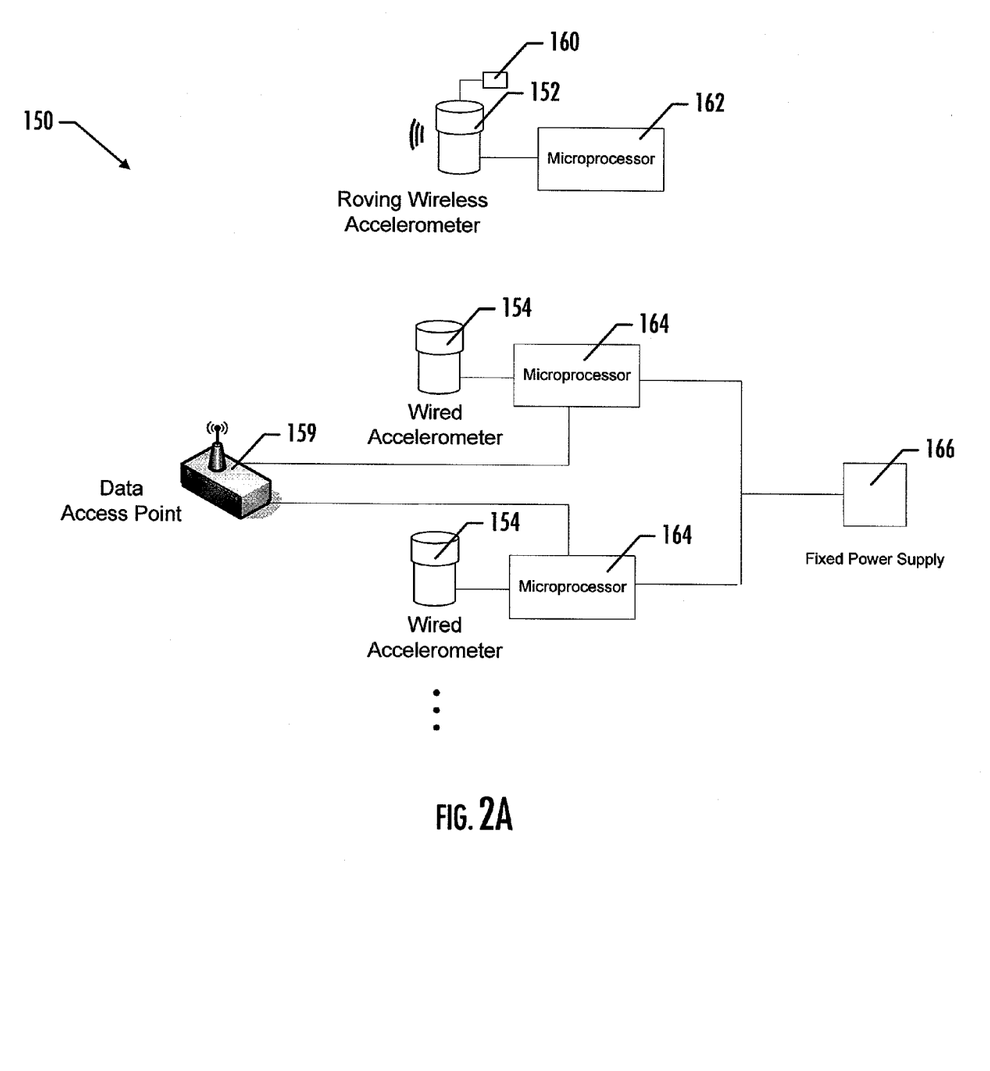
FIG. 2A shows a health and usage monitoring system according to another embodiment of the present invention.

In the depicted embodiment, the roving wireless accelerometer 152 and series of wired accelerometers 154 are configured to monitor one or more components of the aircraft 100 and to communicate monitoring data to respective data access points. In particular, the roving wireless accelerometer 152 is configured to wirelessly communicate monitoring data to a wireless data access point 156, and the wired accelerometers 154 are configured to communicate monitoring data via a wired connection to a second data access point 158. It should be noted that although in the depicted embodiment the data access points 156 and 158 are shown as separate devices, in other embodiments they may comprise a single device 159 that is capable of receiving both wireless and wired transmissions, as shown in FIG. 2A.

The roving wireless accelerometer 152 includes a power supply 160 and a processing element 162. In the depicted embodiment, the power supply 160 comprises a dedicated battery, however in other embodiments the power supply 160 may be any device or combination of devices configured to provide power to the roving wireless accelerometer 152. Examples of such devices may include energy harvesting devices, including, but not limited to, inductive energy harvesting (IEH) devices and piezoelectric energy harvesting (PEH) devices. The processing element 162 is configured to control the roving wireless accelerometer 152. Although in the depicted embodiment, the processing element 162 comprises a microprocessor, in various embodiments the processing element 162 may be embodied in a number of different ways. For example, the processing element 162 may be embodied as a processor, a microprocessor, a coprocessor, a controller or various other processing means or devices including integrated circuits such as, for example, an ASIC (application specific integrated circuit), or a FPGA (field-programmable gate array). The wired accelerometers 154 also include processing elements 164 configured to control the wired accelerometers 154, which may be embodied as described above, and in the depicted embodiment comprise microprocessors. In the depicted embodiment, the wired accelerometers 154 include individual processing elements 164, however in other embodiments the wired accelerometers 154 may have other configurations, such as, for example, configurations where the wired accelerometers 154 are controlled by a single processing element 164. In the depicted embodiment, the wired accelerometers 154 are powered by a fixed power supply 166, however in other embodiments, the wired accelerometers 154 may be powered by any device or combination of devices configured to provide power to a wired accelerometer, including one or more batteries and/or energy harvesting devices.

In the depicted embodiment, the processing element 162 of the roving wireless sensor 152 and the processing elements 164 of the wired accelerometers 154 may control the respective accelerometers 152, 154 in a variety of ways including controlling the accelerometers 152, 154 according to a predefined routine so as to sample and transmit data for a defined period of time, to pause for a period of time, and to repeat the process. In other instances, the processing elements 162, 164 may control the accelerometers 152, 154 to sample and transmit vibration data continuously. In still other instances, the processing elements 162, 164 may control the accelerometers 152, 154 to sample vibration data continuously and to transmit the data periodically, such as after a predefined period of time or when data sample(s) exceed or fall below a threshold value. In other instances, one or both of the accelerometers 152, 154 may be controlled to collect data such that the data collection is synchronous with an external signal, including, but not limited to, a tachometer signal. In other instances one or both of the accelerometers 152, 154 may be controlled such that data collection is synchronous with an event, including, but not limited to, a high torque maneuver. In various instances, control of one or both of the accelerometers 152, 154 may be via the respective processing elements 162, 164, data access points 156, 158, or a combination thereof. In some embodiments, one or both of the data access points 156, 158 may transmit the data locally and/or externally for real-time analysis. In other embodiments, one or both of the data access points 156, 158 may be in communication with a memory device, which may include, for example, volatile and/or non-volatile memory. In such an embodiment, the data may be available to be accessed at a later time, such as during standard maintenance and inspection procedures after each flight.

Additionally, the processing element 162 of the roving wireless accelerometer 152 may include software that may be configured to provide power management for the power supply 160. As such, the processing element 162 may make efficient use of the power supplied by the power supply 160. The processing element 162 may also be configured to provide programmable data sample rates, allowing a user to tune the roving wireless accelerometer 152 for use with different wireless communications protocols, including, but not limited to, ZigBee, Bluetooth, and Ultra-wideband (UWB) wireless communication protocols. The processing element 162 may also be configured to provide programmable data sample rates, allowing a user to tune the roving wireless accelerometer 152 for different applications, such as drive train monitoring (e.g., using high data sampling rate, such as 100 kHz), rotor track and balancing functions (e.g., using a mid range data sampling rate, such as 2500 Hz), and/or structural monitoring (e.g., using a low range data sampling rate, such as 40 to 500 Hz).

Figure 3:
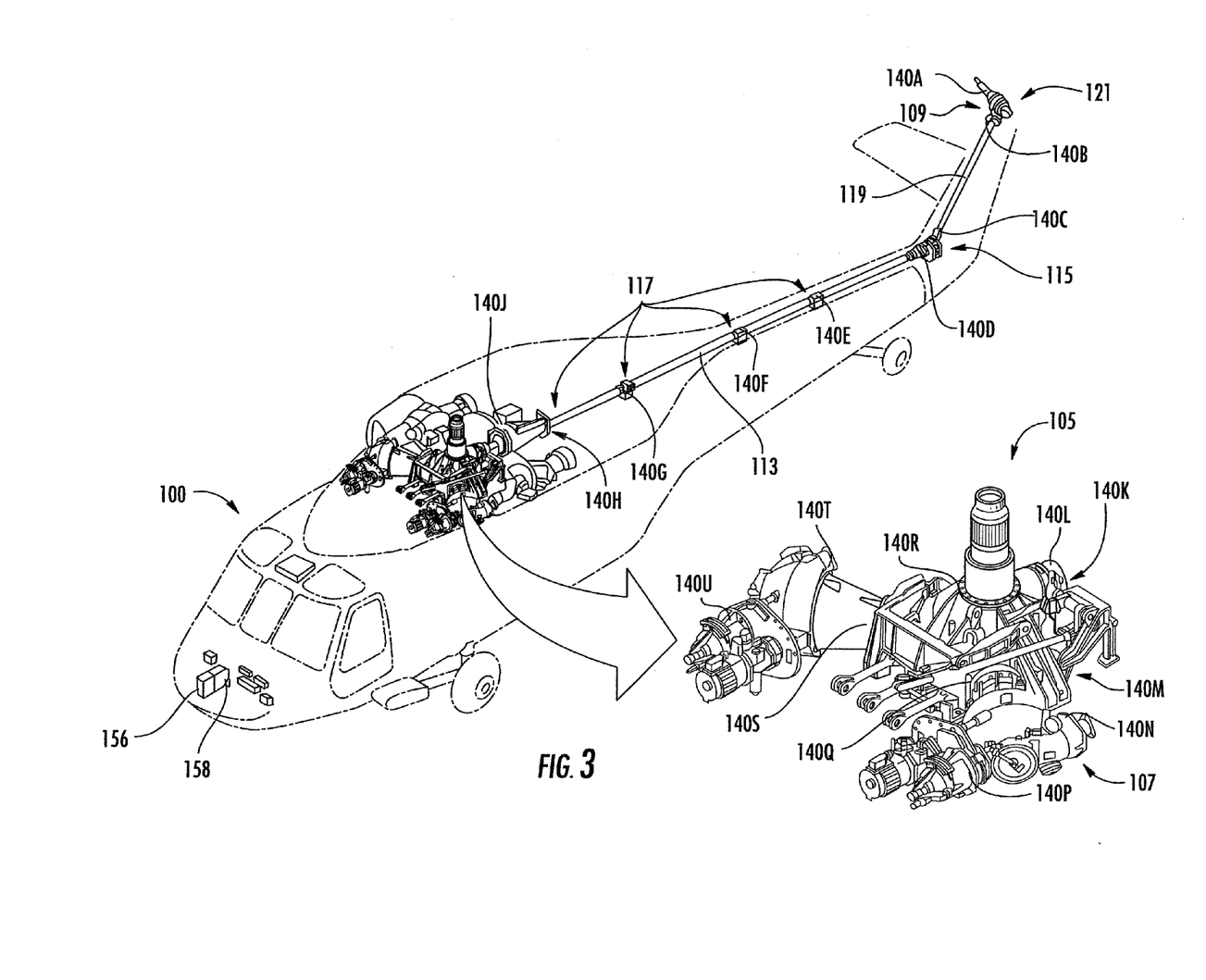
FIG. 3 shows a helicopter employing a health and usage monitoring system for monitoring the health and usage of several components of the helicopter in accordance with another embodiment of the present invention.

As noted above, a failure of an engine and/or drive component of an aircraft, especially a rotary wing aircraft such as helicopter 100, can be catastrophic. However, any increase in weight for such an aircraft translates into large increases in recurring and non-recurring costs associated with operating the aircraft, not to mention the cost of the monitoring system itself. In order to strike a balance between these competing interests, the health and usage monitoring system of the depicted embodiment of the present invention includes at least one roving wireless sensor that may be used together with a series of wired sensors. FIG. 3 shows the helicopter 100 of FIG. 1 employing a health and usage monitoring system such the health and usage monitoring system embodiment described with respect to FIG. 2, for monitoring the health and usage of several components of the engine and drive train of the helicopter 100 in accordance with one embodiment of the present invention.

Although in other embodiments, the sensors of a health and usage monitoring system in accordance with the present invention may include no wired sensors (such as those embodiments that only include one or more roving wireless sensors), some embodiments may include wired sensors for those components for which constant monitoring is desired. Moreover, a vehicle that already contains a health and usage monitoring system comprising wired sensors may be converted to employ the present invention by leaving some of the existing wired sensors in place for monitoring certain components, and using one or more roving wireless sensors to replace other wired sensors that are removed.

In the depicted embodiment, components of the drive train are monitored by attaching a series of wired accelerometers 154 to positions proximate various drive train components. Components of the main gear box 107 are monitored using at least one roving wireless accelerometer 152. It should be noted that although sensors may be placed proximate certain components in order to monitor the health and/or usage of that component, the sensors often pick up signals from other components of the aircraft. As a result, in one particular use of the depicted embodiment of the present invention, monitoring data from any of the fixed 154 or wireless 152 accelerometers may indicate a possible issue with another particular component of the aircraft 100. Thus, upon evaluating the monitoring data, technicians could place the roving wireless accelerometer 152 proximate any component of the aircraft in order to monitor that component's health and/or usage.

In the depicted embodiment, the health and/or usage of components of the tail rotor assembly 109 and tail gear box 121 of the aircraft 100 are monitored by attaching a wired accelerometer 154 at a position 140A proximate the tail gear box output and at a position 140B proximate the tail gear box input. The health and/or usage of components of the intermediate gear box 115 are monitored by attaching a wired accelerometer 154 at a position 140C proximate the intermediate gear box output and at a position 140D proximate the intermediate gear box input. The health and/or usage of the first drive shaft 113 and the hanger bearings 117 are monitored by attaching wired accelerometers 154 at positions 140E, 140F, 104G, and 140H, proximate the four hanger bearings 117. And the health and/or usage of the oil cooler fan support bearing is monitored by attaching a wired accelerometer 154 at a position 140J proximate the oil cooler fan shroud.

In the depicted embodiment, the roving wireless accelerometer 152 is used to monitor various components of the main gear box 107 and main rotor assembly 105. As such, the roving wireless accelerometer 152 may be temporarily placed at any one of a number of positions proximate a component of the main gear box 107 or main rotor assembly 105 in order to monitor and communicate monitoring data of that component to the wireless data access point 156. Because the roving wireless accelerometer 152 is configured to be removable and because it is not wired to its data access point 152, it can later be removed from that position and placed at another position proximate another component of the main gear box 107 or main rotor assembly 105 in order to monitor and communicate monitoring data of another component to the wireless data access point 156.

In the depicted embodiment for example, the roving wireless accelerometer 152 may be placed at position 140K proximate the starboard ring gear in order to monitor the health and/or usage of that component, at a position 140L proximate the Tail Takeoff (TTO) radial gear to monitor the health and/or usage of that component, at a position 140M proximate the port ring gear to monitor the health and/or usage of that component, at a position 140N proximate the port accessory gear box input to monitor the health and/or usage of that component, at a position 140P proximate the port accessory gear box output to monitor the health and/or usage of that component, at a position 140Q proximate the port main gear to monitor the health and/or usage of that component, at a position 140R proximate the main mast to monitor the health and/or usage of that component, at a position 140S proximate the starboard main gear to monitor the health and/or usage of that component, at a position 140T proximate the starboard accessory gear box input to monitor the health and/or usage of that component, or at a position 140U proximate the starboard accessory gear box output to monitor the health and/or usage of that component.

It should be noted that in the depicted embodiment, the roving wireless accelerometer 152 may also be used to monitor and/or confirm the monitoring of one or more components of the drive train, or any other component of the aircraft for which monitoring is desired. Thus, although the depicted embodiments of the present invention may only show exemplary uses for the present invention, in other embodiments, various other and/or additional components of the engine and/or drive train may be monitored by a health and usage monitoring system according to the present invention. Such components may include, but need not be limited to, various shafts, bearings, and gears of the engine and/or drive train, which in some embodiments may comprise hundreds of individual components, that are monitored by a plurality of sensors. Other components may include, but need not be limited to, rotating components, such as the main rotor head, or the fuselage itself.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A health and usage monitoring system for use in monitoring health and usage of one or more components of a vehicle, the system comprising:
    a data access point;
    a plurality of wired sensors configured to monitor one or more components of the vehicle while the vehicle is operating, wherein operating the vehicle includes airborne operation or transportive movement of the vehicle; and
    at least one wireless sensor configured to be temporarily mounted in a first position to monitor one or more components of the vehicle while the vehicle is operating and to communicate monitoring data to the data access point, wherein the wireless sensor is further configured to be removable from the first position and mounted in at least one other position to monitor one or more other components of the vehicle and to communicate monitoring data to the data access point, thus allowing two or more components of the vehicle to be monitored using the wireless sensor.

2. The health and usage monitoring system of claim 1, further comprising at least one processing element in communication with and configured to control the wireless sensor.

3. The health and usage monitoring system of claim 2, wherein the processing element comprises power management software configured to manage power usage of the wireless sensor.

4. The health and usage monitoring system of claim 2, wherein the processing element is configured to provide programmable data sample rates.

5. The health and usage monitoring system of claim 1, further comprising at least one power supply configured to provide power to the wireless sensor.

6. The health and usage monitoring system of claim 5, wherein the power supply comprises at least one of a battery or an energy harvesting device.

7. The health and usage monitoring system of claim 6, wherein the power supply comprises one of an inductive energy harvesting device or a piezoelectric energy harvesting device.

8. The health and usage system of claim 1, wherein the wireless sensor comprises a wireless accelerometer.

9. The health and usage system of claim 1, wherein the health and usage monitoring system is configured to monitor one or more components of a helicopter.

10. The health and usage monitoring system of claim 1, wherein the wireless sensor is configured to monitor one or more components of a helicopter, and wherein the one or more components is selected from the group consisting of:
    one or more components of a tail gear box of the helicopter;
    one or more components of a tail rotor assembly of the helicopter;
    one or more components of an intermediate gear box of the helicopter;
    one or more drive shaft bearings of the helicopter;
    one or more components of an engine of the helicopter;
    one or more components of a main gear box of the helicopter;
    one or more components of a main rotor assembly of the helicopter; and
    combinations thereof.

11. The health and usage monitoring system of claim 1, further comprising at least one wired sensor configured to monitor one or more components of the vehicle and to communicate monitoring data to the data access point via a wired connection.

12. The health and usage monitoring system of claim 1, wherein the wireless sensor is configured to monitor one or more components of a helicopter, and wherein the one or more components includes one or more components of a main rotor head of the helicopter or one or more components of a fuselage of the helicopter.

13. A method of monitoring the health and usage of one or more components of a vehicle, the method comprising:
    mounting at least one wireless sensor in a first position proximate one or more components of the vehicle;
    operating the vehicle, wherein operating the vehicle includes airborne operation or transportive movement of the vehicle;
    monitoring the one or more components of the vehicle with the wireless sensor while the vehicle is operating and communicating monitoring data to a data access point;
    removing the wireless sensor from the first position;

mounting the wireless sensor in a second position proximate one or more other components of the vehicle; and
monitoring the one or more other components of the vehicle with the wireless sensor while the vehicle is operating and communicating monitoring data to the data access point.

14. The method of claim 13, further comprising controlling the wireless sensor with at least one processing element.

15. The method of claim 14, wherein the processing element comprises power management software configured to manage power usage of the wireless sensor.

16. The method of claim 14, wherein the processing element is configured to provide programmable data sample rates.

17. The method of claim 13, further comprising providing power to the wireless sensor using at least one power supply.

18. The method of claim 17, wherein the power supply comprises at least one of a battery or an energy harvesting device.

19. The method of claim 18, wherein the power supply comprises one of an inductive energy harvesting device or a piezoelectric energy harvesting device.

20. The method of claim 13, wherein the wireless sensor comprises a wireless accelerometer.

21. The method of claim 13, wherein operating the vehicle comprises operating a helicopter.

22. The method of claim 13, wherein operating the vehicle comprises operating a helicopter, and wherein the first and second positions are proximate one or more components of the helicopter selected from the group consisting of:
one or more components of a tail gear box of the helicopter;
one or more components of a tail rotor assembly of the helicopter;
one or more components of an intermediate gear box of the helicopter;
one or more drive shaft bearings of the helicopter;
one or more components of an engine of the helicopter;
one or more components of a main gear box of the helicopter;
one or more components of a main rotor assembly of the helicopter; and
combinations thereof.

23. The method of claim 13, wherein operating the vehicle comprises operating a helicopter, and wherein the first and second positions are proximate one or more components of a main rotor head of the helicopter or one or more components of a fuselage of the helicopter.

24. A method of monitoring the health and usage of one or more components of a vehicle, the method comprising:
placing a plurality of wired sensors in fixed positions proximate one or more components of the vehicle;
mounting at least one wireless sensor in a first position proximate one or more components of the vehicle;
operating the vehicle;
monitoring the one or more components with the wired sensor while the vehicle is operating and communicating monitoring data to a data access point via a wired connection;
monitoring the one or more components of the vehicle with the wireless sensor while the vehicle is operating and communicating monitoring data to the data access point;
removing the wireless sensor from the first position;
mounting the wireless sensor in a second position proximate one or more other components of the vehicle; and
monitoring the one or more other components of the vehicle with the wireless sensor while the vehicle is operating and communicating monitoring data to the data access point.

25. A health and usage monitoring system for use in monitoring health and usage of one or more components of a vehicle, the system comprising:
a data access point; and
at least one wireless sensor configured to be temporarily placed in a first position to monitor one or more components of the vehicle and to communicate monitoring data to the data access point,
wherein the wireless sensor is further configured to be removable from the first position and placeable in at least one other position to monitor one or more other components of the vehicle and to communicate monitoring data to the data access point, thus allowing two or more components of the vehicle to be monitored using the wireless sensor, wherein the wireless sensor is configured to monitor one or more components of a helicopter, and wherein the one or more components is selected from the group consisting of:
one or more components of a tail gear box of the helicopter;
one or more components of a tail rotor assembly of the helicopter;
one or more components of an intermediate gear box of the helicopter;
one or more drive shaft bearings of the helicopter;
one or more components of an engine of the helicopter;
one or more components of a main gear box of the helicopter;
one or more components of a main rotor assembly of the helicopter; and
combinations thereof.

26. A method of monitoring the health and usage of one or more components of a vehicle, the method comprising:
placing at least one wireless sensor in a first position proximate one or more components of the vehicle;
operating the vehicle;
monitoring the one or more components of the vehicle with the wireless sensor and communicating monitoring data to a data access point;
removing the wireless sensor from the first position;
placing the wireless sensor in a second position proximate one or more other components of the vehicle; and
monitoring the one or more other components of the vehicle with the wireless sensor and communicating monitoring data to the data access point,
wherein operating the vehicle comprises operating a helicopter, and wherein the first and second positions are proximate one or more components of the helicopter selected from the group consisting of:
one or more components of a tail gear box of the helicopter;
one or more components of a tail rotor assembly of the helicopter;
one or more components of an intermediate gear box of the helicopter;
one or more drive shaft bearings of the helicopter;
one or more components of an engine of the helicopter;
one or more components of a main gear box of the helicopter;
one or more components of a main rotor assembly of the helicopter; and
combinations thereof.

27. A method of monitoring the health and usage of one or more components of a vehicle, the method comprising:

placing at least one wired sensor in a fixed position proximate one or more components of the vehicle;
placing at least one wireless sensor in a first position proximate one or more components of the vehicle;
operating the vehicle;
monitoring the one or more components with the wired sensor and communicating monitoring data to a data access point via a wired connection;
monitoring the one or more components of the vehicle with the wireless sensor and communicating monitoring data to the data access point;
removing the wireless sensor from the first position;
placing the wireless sensor in a second position proximate one or more other components of the vehicle; and
monitoring the one or more other components of the vehicle with the wireless sensor and communicating monitoring data to the data access point,
wherein operating the vehicle comprises operating a helicopter, and wherein the first and second positions are proximate one or more components of the helicopter selected from the group consisting of:
one or more components of a tail gear box of the helicopter;
one or more components of a tail rotor assembly of the helicopter;
one or more components of an intermediate gear box of the helicopter;
one or more drive shaft bearings of the helicopter;
one or more components of an engine of the helicopter;
one or more components of a main gear box of the helicopter;
one or more components of a main rotor assembly of the helicopter; and
combinations thereof.

* * * * *